United States Patent [19]

Perrington et al.

[11] Patent Number: 5,556,826

[45] Date of Patent: *Sep. 17, 1996

[54] LASER PERFORATION OF PAPER

[75] Inventors: Kenneth J. Perrington, Maplewood; Robert D. Kampfer, St. Paul, both of Minn.

[73] Assignee: Minnesota Mining and Manufacturing Company, St. Paul, Minn.

[*] Notice: The term of this patent shall not extend beyond the expiration date of Pat. No. 5,444,035.

[21] Appl. No.: 443,472

[22] Filed: May 18, 1995

Related U.S. Application Data

[63] Continuation of Ser. No. 264,848, Jun. 23, 1994, Pat. No. 5,444,035, which is a continuation of Ser. No. 768,429, Aug. 16, 1991, abandoned, which is a continuation-in-part of Ser. No. 570,127, Aug. 17, 1990, abandoned.

[51] Int. Cl.$^6$ ..................... B41M 5/20
[52] U.S. Cl. ............ 503/200; 503/226; 156/253; 428/43; 428/137; 428/211; 430/945
[58] Field of Search .................. 428/195, 913, 428/914, 43, 137, 211; 503/201, 200, 226; 156/253; 430/945

[56] References Cited

U.S. PATENT DOCUMENTS

| | | | |
|---|---|---|---|
| 3,226,527 | 12/1965 | Harding | 219/38.4 |
| 3,790,744 | 2/1974 | Bowen | 219/121 |
| 3,909,582 | 9/1975 | Bowen | 219/121 |
| 4,231,273 | 11/1980 | Walter | 83/510 |
| 4,265,254 | 5/1981 | Koch et al. | 131/281 |
| 4,297,559 | 10/1981 | Whitmann, III | 219/121 |
| 4,446,187 | 5/1984 | Eklund | 428/136 |
| 4,449,361 | 5/1984 | Hahnel . | |
| 4,449,362 | 5/1984 | Frankenberg et al. . | |
| 4,458,133 | 7/1984 | Macken . | |
| 4,569,359 | 2/1986 | Nowers et al. . | |
| 4,613,742 | 9/1986 | Nelson et al. . | |
| 4,906,605 | 3/1990 | Kraft . | |
| 4,996,184 | 2/1991 | Bevan et al. | 503/226 |

FOREIGN PATENT DOCUMENTS

| | | |
|---|---|---|
| 0008161 | 2/1980 | European Pat. Off. . |
| 1002192 | 2/1957 | Germany . |
| 7629261 | 1/1977 | Germany . |
| 3222394 | 12/1983 | Germany . |
| 4023997A1 | 1/1992 | Germany . |
| 4023997 | 1/1992 | Germany . |
| 968824 | 9/1964 | United Kingdom . |
| 1442002 | 8/1974 | United Kingdom . |
| 2062576 | 5/1981 | United Kingdom . |

OTHER PUBLICATIONS

"Low–Cost Laser Systems Can Replace Mechanical Equipment in Packaging Applications: Sealing, Cutting, Perforating and Marking By Laser Are All Feasible" By Mark B. Cummings, Laakmaan Electro–Optics, Inc., Packaging Technology, Mar./Apr. 1987, pp. 8–9.

"Paper Cutting by $CO_2$ Laser" By C. H. Miller, and T. A. Osial and A. Van Der Jagt, Westinghouse Electric Corp., U.S.A., Technical Paper T343, Pulp and Paper Magazine of Canada, vol. 71, No. 16/Aug. 21, 1970, pp. 62–72.

Abstract, INSPEC No. A89120167, B89062793 of Kityani, M. et al. "$CO_2$ Laser Applications," Mitsubishi Denki Giho, vol. 63, No. 4 pp. 281–286 (1989). Translation attached.

(List continued on next page.)

*Primary Examiner*—William A. Krynski
*Attorney, Agent, or Firm*—Gary L. Griswold; Walter N. Kirn

[57] ABSTRACT

Laser perforation of all types of paper provides paper having sufficient strength characteristics to survive stresses imposed during handling, such as experienced in sheet feed processes. The paper so perforated is readily separable along the perforation line when separation is desired. Carbonless paper products particularly benefit from use of a laser in perforation. The paper, capsule, and capsule fill material are vaporized during the laser process, thus forming clean holes and leaving little residual material on the paper.

20 Claims, 1 Drawing Sheet

OTHER PUBLICATIONS

Abstract, Paperchem No. 44-02522 of Revue Europeenne Papiers, Cartons Complexes "Future of the Laser in Cutting of Paper," Oct. 1972, pp. 51-52. Translation attached.

Patent Abstract of Japan, JP59095569, published Jan. 6, 1984.

Hattori, et al., "Paper Cutting by $CO_2$ Laser", Journal of the Society of Materials Science, Japan, Zairyo, vol. 28, No. 310, Jul. 1979, pp. 603-609 (translation).

Miller, C. H. et al., "Status Report on 250 Watt $CO_2$ Laser For Applications in the Pulp and Paper Industry," Presentation at the Fifteenth Annual IEEE Pulp & Paper Conference, Atlanta, Georgia, May 7-10, 1969.

British Printer, "Carbonless Consolidates," Feb. 1991.

Mommsen, J. et al., "Laser-cutting and Perforating".

Duley, W. W., "$CO_2$ Lasers—Effects and Applications, Academic Press", pp. 267-268.

Abstract, Paperchem No:46-05226 of German Patent 2,343,996.

Coherent Seminar Material, 1978.

Pineaux, Bernard. "The Effect of Laser Beam Cuts on the Strength of Paper Edges", Thesis-Rochester Institute of Technology, Feb., 1988.

Hattori, N, et al., "Microscopic Observations of the Solid Products Deposited on the Edge of Papers by $CO_2$ Laser Cutting" Mokuzai Gakkaishi, vol. 34, No. 5, pp. 417-422 (1988).

Pineaux, B., "La Decoupe du Papier Au Rayon Laser." Revue IG No. 375:43-47 (May 1989), with translation.

Srinivasan et al. *Polymer* (1985) vol. 26 pp. 1297-1299.

Honicke, H.; Albrecht, J. The Paper Maker, 1969, 157,46.

Engineering Index Annual, 1980, 79, 061896, Abstract of Hattori, Nobuaki (Kyoto Univ. Jpn); Sugihara, Hikoichi; Nagano, Yukitaka; Zairyo vol. 28 n 310 Jul. 1979, pp. 603-609.

Ratoff, Paul, et al., "The Laser in the Paper Mill—Cutting, Perforating or Scoring", Chem. 26, (Mar. 1973), pp. 50-53.

Laser-Cutting and Perforating of Filter Paper, Dipl.-Ing. J. Mommsen et al., Papier +Kunststoff Verarbeiter, 9.80, pp. 10-14.

Lawson, Wiliam E., "Application of Laser Technology to the Processing of Nonwovens and composites," Presentation at Impact 86 International Conference, Florida, Mar. 20-21, 1986.

Lawson, William E., "Laser Processing of thin Materials," presentation at Emerging Textile Technologies, Dec. 8-9, 1987, Greenfield, S.C.

Copy magazine, Jul. 1990, vol. 10, No. 7.

Pulp & Paper, Mar. 1973, pp. 128-130.

Nonwovens World, Aug. 1986, pp. 88-92.

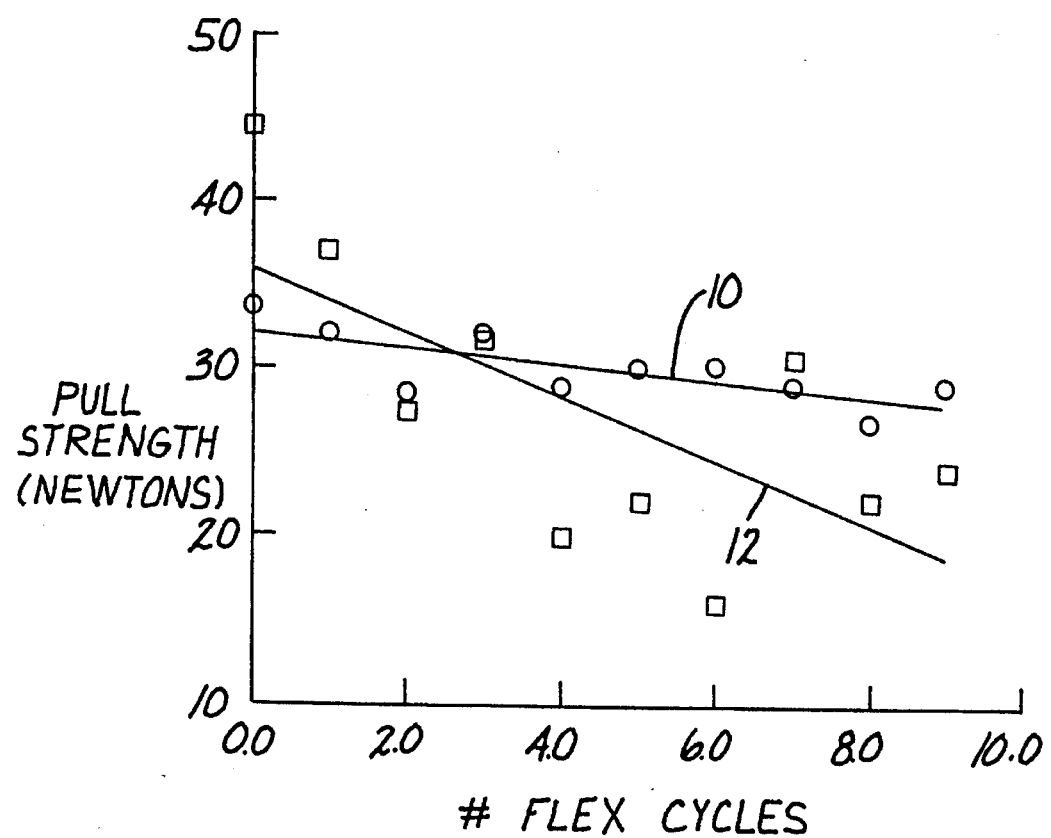

LASER PERFORATION OF PAPER

This application is a continuation application of U.S. application Ser. No. 08/264,848, filed Jun. 23, 1994, now U.S. Pat. No. 5,444,035, which is a continuation application of U.S. application No. 07/768,429, filed Aug. 16, 1991, now abandoned, which was a continuation-in-part application of U.S. application Ser. No. 07/570,127, filed Aug. 17, 1990, now abandoned.

BACKGROUND OF THE INVENTION

1. Field of the Invention

This invention relates to the field of paper and, more particularly, to perforated sheets for sheets, pads, and form-sets of paper and carbonless paper.

2. Description of the Related Art

Carbonless copy paper is capable of producing an image upon application of pressure and generally involves coating a reactant, such as a color-former, on one substrate, and a co-reactant, such as a developer, on a second mating substrate. Separation and prevention of premature reaction of the reactants is accomplished by encapsulation of one of the reactants. The color-former is a color-forming compound that is contained or encapsulated in microcapsules on one sheet of paper. The co-reactant (the developer) is carried on a mating sheet of paper. The microcapsules thereafter isolate the two co-reactants until such time as pressure is applied to the paper, thereby breaking the microcapsules for the purpose of creating an image.

A common construction comprises encapsulated color-formers dissolved in an appropriate solvent, and coated onto the back side of a donor sheet in a suitable binder, referred to as a "coated back" (CB) sheet. The term "suitable binder" refers to a material, such as starch or latex, that allows for dispersion of the reactants in a coating on a substrate, and is readily rupturable under hand-held stylus pressure, or typical business machine key pressure. The developer, optionally in a suitable binder, is coated onto the front side of a mating or receptor sheet, referred to as a "coated front" (CF) sheet. When activating pressure is applied to the face of the donor sheet, the capsules rupture and release color-former for transfer to the receptor sheet, thus forming a colored pattern due to the reaction between the color-former and developer. Such a construction is known as a "form-set" construction.

Constructions also include substrates with one surface coated with an encapsulated color-former, and a second, opposite, surface on which is coated a developer. Such sheets are generally referred to as "CFB" sheets (i.e., coated front and back sheets). CFB sheets can be placed between CF and CB sheets to provide a construction involving a plurality of substrates. Each side, including color-former thereon, should be placed in juxtaposition with a sheet having a developer thereon. CFB sheets are also typically used in form-sets. In some applications, multiple CFB sheets have been used in form-sets.

An alternative to the use of CB, CF, and CFB sheets is a self-contained carbonless paper in which both the color-former and developer are applied to the same side of a sheet and are incorporated into the fiber lattice of a paper sheet.

In one commercial product, microcapsules on the donor sheet contain dithiooxamide (DTO) derivatives, and the receptor sheet is coated with selected salts of nickel. When the two coated faces are contacted such that the derivatives and the metal salt can combine and react, a coordination complex forms and an image results. Typically, this occurs by transfer of the derivative to the site of the metal salt, i.e., transfer of the derivative from the donor sheet to the receptor sheet. The image thereafter forms on the receptor sheet.

Carbonless papers are widely used in the forms industry and form-sets are often prepared by collating from about two to eight sheets of carbonless paper. Pads are often prepared by edge-padding or gluing the edges of a stack of form-sets. Each of the coated sheets in a form-set is somewhat porous and permits the adhesive to penetrate into the pores of the paper, such penetration being necessary to attain satisfactory adhesion. By tearing along the adhesively bound edge, the sheets of a form-set are separated.

"Fan-apart" is a method of separating a stack or pad of multiple form-sets into individual sets. One method of "fan-apart" involves a stack of collated sheets being gripped at the edge-padded end of the stack with one hand and the unpadded end with the other, and bending the stack into a "U" shape. While holding the stack horizontally, the padded end is released and allowed to droop downward. This provides enough stress on the adhesive to separate the pad or stack into individual form-sets.

Carbonless copy paper form-sets often have a coating (such as a fluorocarbon coating) on at least one of the outer faces of each form-set. Fluorocarbon coatings provide low adhesion properties to the outer faces of the pad and promote the "fan-apart properties" in the edge padding. In collated carbonless copy papers currently on the market, at least one of the outer faces of each form-set typically has been treated with a silicone, fluorocarbon, or some other coating which counteracts curling that otherwise would result from the functional coating on the other surface of that sheet. The low adhesion coating also acts as a release agent for the edge-padding adhesive such that the adhesively edge-padded stack can "fan-apart" and separate into individual form-sets.

Perforation of each sheet of a form-set is often desired. In use, the individual sheets of the padded form-set are separated by tearing along the perforation. Typically, the edges of the form-set are perforated, affording a form portion and an edge or tab portion. Such constructions are known as snap-out or uni-set forms.

The method currently used to perforate carbonless paper is mechanical perforation. An apparatus for perforating sheet material is disclosed by W. H. Harding in U.S. Pat. No. 3,226,527. However, this method has not been completely satisfactory. Mechanical perforation of the carbonless paper ruptures some microcapsules with resultant staining around the perforations. Furthermore, mechanical perforation in either carbonless paper or regular paper scores and weakens the paper along the row of perforations, thus leading to a weakened perforation area which may prematurely release. Another problem encountered with mechanical perforation includes the presence of a burr left on the paper such that a stack of the perforated paper is thicker in the perforated region due to the burred areas, and thus the stack does not lie flat. Attempts to remove these burrs leads to removal of the paper coatings necessary for proper development of images on carbonless paper and adds another expensive step to processing either carbonless paper or regular paper. Another disadvantage of mechanical perforation includes the accumulation of lint and paper dust around the punched holes, which often clings to the form set and must be manually removed.

Carbonless paper may be perforated either before, after, or as the forms are printed, using either a lithographic press, an offset press, or a perforating machine.

Perforating can be carried out on a lithographic press either before or after printing by using a material known as perforating tape, a narrow piece of metal with upraised spikes which is attached to the impression roll of the press. Feeding of the paper through the press thus results in impingement of the perforating tape on the paper. However, because of the construction of the lithographic press, the rotation of the impression roll also results in impingement of the perforating tape on the rubber blanket roll, resulting in perforation and consequent destruction of the blanket. The printer must therefore allow for the cost of replacement of the blanket when figuring the cost of the job. This two-step operation requires additional time and expense on the part of the printer.

As discussed previously, if paper is perforated by any of the above methods prior to printing, the burr of paper detritus on the paper thickens the paper stack in the region of perforation. The resulting stack does not lie flat and subsequent attempts to stack such pre-perforated paper in a printing press or copy machine often results in jamming of the paper feed apparatus, causing ruined sheets. Gripping of the perforated edge of the paper during the feed step of printing or duplicating can also result in premature tearing of the paper along the perforation. The press or copy machine thus needs to be closely monitored to prevent jamming and overflow in the receiving tray.

An additional problem results when the carbonless paper is mechanically perforated. Mechanical perforation of the collated paper, at any stage in form-set production, results in capsule rupture and transfer of the color-former from the CB sheet to the developer sheet. As a result, an unsightly line forms along the line of perforation and also occurs in regions adjacent the perforation.

To compensate for the losses of carbonless paper sheets during the perforation processes presently employed, additional paper must be used to assure that the required number of acceptable form-sets have been prepared at the end of the printing job. This additional press run can require up to 10% more paper being used and also adversely effects the productivity of the printing operation.

For the above-mentioned reasons, it is difficult to prepare perforated pads and form-sets employing carbonless paper, and to prepare paper having a perforation that is suitable for feeding through sheet-fed equipment. It would be desirable to have a method of perforating paper which would provide sheets which lay flat, can be easily packaged, boxed and shipped, are easy to print and pad and, in the case of carbonless paper, do not have any staining resulting from premature capsule rupture. Heretofore there has been no method of perforating paper that meets these objectives.

SUMMARY OF THE INVENTION

Paper is provided having a line of perforation separating the sheet into first and second portions. The line of perforation has a post flex pull strength after three cycles of no less than 60% of the initial pull strength and a Tear Strength that is no more than 75% of the force required to tear paper with no perforation.

The present invention also provides a method of perforating a plurality of substrates. The plurality includes at least a first substrate containing a first coating of an encapsulated color-former and a second substrate containing a second coating of a developer. The first and second substrates are positioned such that the first and second coatings are juxtaposed. The method comprises the following steps, performed in any order, of:

(a) securing the first substrate to the second substrate to form a pad or set; and (b) creating a plurality of perforations through the substrates by exposure to a laser beam.

BRIEF DESCRIPTION OF DRAWING

FIG. 1 is a graph showing the pull strength of perforated sheets of carbonless paper which have been flexed a various number of times.

DETAILED DESCRIPTION OF THE INVENTION

The present invention utilizes a laser beam to perforate paper. Paper perforated using laser beam perforation techniques surprisingly are much more capable of surviving stresses experienced in the routine handling of paper, particularly when the paper is processed by machines such as sheet-fed copiers, printers and folding equipment. Surprisingly, the perforated carbonless papers have minimal microcapsule rupture in the region adjacent the perforation when compared to mechanically perforated carbonless paper. The phrase "minimal microcapsule rupture in the perforation region" is meant to denote negligible visible signs of color formation resulting from microcapsule rupture in the region surrounding the perforation, as viewed by the naked eye. Laser perforated paper also has the advantages of a stronger pull strength and the ability to lay flatter than mechanically perforated carbonless paper.

The use of lasers to perforate carbonless paper results in a surprisingly rigid perforation with minimal color formation resulting from premature microcapsule rupture. One might expect the heat generated by the laser would negatively react with the organic coatings and solvents present on the carbonless paper and create a residue on the surface of the paper. Furthermore, the heat of the laser could also be expected to rupture microcapsules in adjacent regions of the perforation. However, it was discovered that laser perforation avoids the above problems and has many advantages over mechanically perforated paper.

Suitable lasers for the present invention include $CO_2$ lasers available from Coherent General Inc. and Apollo Laser Inc. The lasers used in the present invention were an Apollo 580 $CO_2$ laser operable at 10.6 microns and a Coherent Model 525 laser operable at 9.6 and 10.6 microns. Perforation of paper by a laser is accomplished by absorption of high intensity radiation (>500 KWatt/cm$^2$) by the paper fibers. During the laser pulse, the carbonless paper is hydrolyzed and decomposed without melting and with very little residue and dust. The laser process forms very clean perforations. In the context of this invention, a perforation is a hole that extends entirely through the paper.

Laser radiation can be pulsed or chopped, thus radiation striking the paper can be turned on and off to form areas of "holes and lands." The "land" is the area between the holes that was not removed during perforation. The Apollo 580 laser can be used in either "pulsed" or "chopped" mode. In pulsed mode, the laser is turned on and off very rapidly; the duration of each pulse and the time between pulses (i.e., the repetition rate) being variable to control the ratio of the holes and lands and the space between each hole. In chopped mode, the laser beam is interrupted to vary the hole/land ratio and hole spacing. Interruption of the laser beam may be by mechanical means such as a rotating disc or mirror or by electronic means, as for example by an electronically operated shutter. By adjusting the time period in which the laser is incident in conjunction with the web speed of the paper, or by altering the configuration of the laser beam itself, the shape of the hole may itself be altered. Thus, the hole may be round or elongate in shape.

The preferred laser for the present invention is a laser having high beam quality and good pulse characteristics. The combination of these properties in an axial flow laser results in well shaped perforation holes. Lasers in the 300 watt range often have these qualities and are well suited for the present invention. Preferred lasers are high speed pulse lasers commercially available from Trumpf and Company, Gmbh, such as the Model TLF 1000 Turbo with modifications from Laser Machining Incorporated, Somerset, Wis.

Perforation by a laser is non-contact and does not involve stressing the land areas as does mechanical perforation. Mechanical perforation involves some type of blade, needle or spike cutting through the paper. As a result of this cutting action, mechanical perforation results in a pulling of paper fibers from the land areas, thus weakening the perforation. Thus, in contrast to mechanical methods of perforation, laser perforation does not weaken the paper in the land areas along the line of perforation.

The strength of the perforation is an important consideration in carbonless pads and form-sets. If a perforation weakens during shipping and handling, there runs the risk of a single sheet separating from its adjacent sheets in the pad or form-set. Since a carbonless pad of paper requires the color former to be juxtaposed with the developer, the loss of a single sheet can upset this balance. Thus it is important the pad or form-set of carbonless paper remains structurally intact.

The strength of a perforated sheet of paper is related, in part, to the ratio of the areas of the "holes and lands," the thickness and moisture content of the paper, and the nature of the coatings. In general, the larger the hole/land ratio, the easier the paper is to tear. However, if there is too much hole area, then the paper may not have sufficient pull strength and pull apart during printing, padding, and handling. If the hole/land ratio is small, then the paper might not tear along the perforations when the form is separated or "snapped-out" in use. By controlling the on/off time or the configuration of the laser, the ratio of the areas of the lands and holes can be adjusted until the perforations in the paper have the desired properties. It is suggested to have a hole/land area ratio in the range of about 1:1 to 6:1 and preferably in the range of about 2:1 to 4:1.

The strength of the perforation line as presently described is especially advantageous in lightweight papers, because these papers have less bulk in their land areas to provide strength. The line of perforation according to the present invention does not subject the land areas to physical damage, thereby preserving the integrity of the small amount of material remaining. The present invention thus is particularly advantageous for paper having a folio ream weight of 20 pounds or less. Standard paper weights for use in commercial photocopiers, such as folio weight of 20 to 25 pounds, also particularly benefit from the present invention.

Sheets of paper having a line of perforation as described herein are particularly important for applications where the paper is subject to mechanical stresses during handling. Such sheets of paper are typically used for billing statements or forms that otherwise require a return notice in which a portion of the sheet should be torn off and returned to the provider of the form. Preferred configurations for the sheet are where the first portion is about one-third of the area of the second portion of the sheet. Another preferred form configuration is where the first portion is about one-fourth of the area of the second portion of the sheet.

Another preferred configuration of the sheets is in tablet-type constructions. In this configuration, the first portion of the sheet is of a size sufficient to provide a tab edge for adherence to other sheets. The second portion of the sheet has standard paper dimensions, such as 8½ inches by 11 inches, or 11 inches by 14 inches. The first portion of the sheet has dimensions appropriate for fastening to another sheet either by adhesion or mechanical fastening means such as staples. The dimensions for the first portion are, for example, about a ½ inch width by a length equal to one of the sides of the second portion of the sheet.

Similarly, for European paper products, tablets may be made using tab portions separated from a second portion of the main sheet, where the second portion is of standard European measurement. For example, A4 paper would have a measurement of 20.8 cm by 29.4 cm. An appropriate tableting sheet would have a first portion with dimensions of about 1.3 cm by 20.8 cm or 1.3 cm by 29.4 cm.

Very often in the printing and copying industry, sheets are printed or copied on sheets that are two or more times the size of the intended final product. The sheet is then cut in half or thirds, or as otherwise appropriate, to provide the desired size of the final product. This reduces the number of sheets that must pass through the printing or copying process. When oversized sheets such as this are used, the optimum dimensions are then doubled, tripled, etc. For example, preferred sheets may have the dimensions of 11½ inches by 17 inches, with the first portion having a dimension of about ½ inch by 17 inches and the second portion having a dimension of 11 inches by 17 inches. After the sheet is printed, copied, or otherwise manipulated, the sheet is cut in half to provide two sheets having the dimensions of 11½ inches by 8½ inches. Similarly, the sheet may have the overall dimensions of 23 inches by 17 inches, which is divided into three separate portions. The first portion would have a dimension of about ½ inch by 17 inches, the second portion would have a dimension of ½ inch by 17 inches and the third portion located between the first and second portions would have dimension of 22 inches by 17 inches. A sheet of this size would be cut into four equal portions after being printed or photo-copied, providing four separate pieces suitable for later tableting. Variations of sheet size and location of perforations are also envisioned to provide different sizes of standard paper tablets or increased numbers of tablet size sheets from the single large sheet. Likewise, a single narrow first portion of the sheet may separate larger second and third portions of the sheet. The tablet-size pieces of paper may be cut from the single large sheet by bisecting the narrow first portion, rather than having narrower portions on the edges away from the cut line.

Pull Strength Test

The quality and strength of the perforated region of perforated carbonless sheets can be evaluated by a test showing the force required to tear a sheet of perforated carbonless paper from the tab (the smaller region on one side of the perforation line) using a tension measurement device, i e., "Digital Force Gauge Model DFG RS-50" available from John Cotillion & Sons, Inc., Greensboro, N.C. With the tab edge of the perforated sheet in the clamp, the opposite end of the sheet is gripped by the thumb, fingers and palm of one hand and pulled slowly until the paper tears along the perforations.

When the "Pull Strength" exceeds about 33N (33 Newtons) across a width of 8.5 inches (21.6 cm) (that is, 1.53 N/cm), a perforated sheet should withstand premature separation in any ordinary printing or photocopying operation. Pull strengths exceeding 1.53 N/cm are preferred.

Post-Flex Pull Strength Test

The strength of the perforation line may be further evaluated by first exposing the perforation line to controlled flexing conditions. In this test, the sample is selected to have dimensions of 2.5 inches by 11.5 inches, with a tab portion located at one end, and separated from the balance of the sheet by a perforation line. The tab portion has the dimensions of 0.5 inch by 2.5 inches. The sheet was flexed twice 180° along the perforation line, the first flex involved bending the tab until the tab contacted a front portion of the sheet, and a second bending in the opposite direction until the tab contacted a back portion of the sheet. The set of a first and second bending of the sample as described above is considered one complete flex cycle. Care is taken to avoid pinching the sheet on opposite sides of the perforation line in close proximity to the line, because it is not desirable to introduce a score line to the paper that corresponds to the perforation line. The sample is then subjected to the Pull Strength Test described above. Paper perforated in accordance with this invention should have a Post-Flex Pull Strength after 3 cycles of no less than 60% of the initial Pull Strength. Preferably, the Post-Flex Pull Strength after 3 cycles is no less than 70% of the initial Pull Strength, and more preferably no less than 80% of the initial Pull Strength.

Tear Strength Test

The ease of tear-out, (also known as snap-out) or separation along the perforations, of a sheet of perforated paper can be evaluated by a test showing the force required to tear a sheet of perforated paper from the tab (the smaller region on one side of the perforation line) in a manner similar to that described above for measuring pull strength. Again, the sample is selected to have dimensions of 2.5 inches by 11.5 inches, with a tab portion located at one end, and separated from the balance of the sheet by a perforation line. The tab portion has the dimensions of 0.5 inch by 2.5 inches. Using the "Digital Force Gauge Model DFG RS-50" tension measurement device described above, the 0.5 inch (1.27 cm) tab edge of the perforated sheet was placed in the clamp and the opposite end of the sheet is gripped by the thumb, and fingers and palm of one hand. The paper is skewed 10° to simulate the tearing-out or snapping-out of a sheet of paper from a form-set and pulled slowly until the paper tears along the perforations. This test is repeated for each type of paper ten times. The highest and lowest values are thrown out and an average of the rest of the values is determined. The strength that is reported is the maximum force in Newtons required to completely separate the two portions of paper. That force is no more than 75% of the force required to tear the piece of paper under the same conditions without the presence of a perforation line. Preferably, the Tear Strength is no more than 50% of the force required to tear paper with no perforation, and more preferably no more than 25% of the force required to tear the paper.

As a general principle, when the Tear Strength is less than 15 N, a perforated sheet should tear-out satisfactorily from a form-set in most any paper. Preferably, the Tear Strength should be between 1 and 8 N.

EXPERIMENTAL EXAMPLES

The present invention will be further described by reference to the following detailed examples. These examples are presented to illustrate the operation of the invention and are not to be construed as limiting its scope.

EXPERIMENT 1

A series of perforation conditions were used to perforate carbonless paper. The carbonless paper was 4-part, pre-collated carbonless paper available from the Carbonless Products Department of 3M Company, St. Paul, Minn. A Coherent Model 525 $CO_2$ laser with operation in the pulsed mode and the standard $CO_2$ mixture were used. Web speed was 700 ft/min (213 m/min) and laser power was adjusted for 180 W for each setting.

Pulse rates of approximately 1000–2000 pulse/sec resulted in perforations having good Tear Strengths. A CO2 laser operating at a pulse rate of greater than about 2000 Hz was observed not to shut off completely between pulses. Results are shown in Table 1 below:

TABLE 1

| Relationship Between Pulse Rate, Length, and Pull Strength | | |
|---|---|---|
| Pulse Rate (pps) | Pulse Length (msec) | Pull Strength (N/cm) |
| 1000 | 0.8 | 2.0 |
| 1500 | 0.4 | 5.9 |
| 1500 | 0.5 | 4.1 |
| 1500 | 0.6 | 2.8 |
| 2000 | 0.20 | 3.5 |
| 2000 | 0.25 | 4.3 |
| 2000 | 0.30 | 3.2 |
| 2000 | 0.40 | 2.6 |
| 2000 | 0.7 | 2.5 |

It is desirable to have a pull strength of at least about 2.0 N/cm. The pulse rate and pulse length are both variables which affect the pull strength. Some applications require stronger pull strengths and the pulse rate and length may be adjusted accordingly.

EXPERIMENT 2

A system for perforating a roll of carbonless CB paper was set up to pilot the conditions likely to be found in perforating carbonless paper in a manufacturing operation. The system consisted of an unwind roll, a laser, a printing press, a sheeter to cut the printed paper into sheets, and a stacking bin. The laser was set approximately ½" (1.27 cm) from the edge of the paper to afford a salvage. The paper was an 8" wide (20.3 cm) blue/purple CB carbonless paper roll manufactured by the Carbonless Products Department of 3M Company, St. Paul, Minn. The Apollo Model 580 $CO_2$ laser was installed between the unwind roll assembly and the printing press, and was adjusted to focus onto the crown of a steel roller over which the paper passed. The press was a Didde-Apollo printing press equipped with a sheeter to cut the paper, and no printing was done on the paper. Cooling water, a gas cylinder containing pre-mixed $CO_2$ gas, and electric power were provided to the laser. Preliminary tests indicated that the laser worked best in "chopped mode."

The laser was adjusted to output 75 W at maximum current, 750 pulse per second pulse rate, and 0.1 msec pulse length. Sheets containing 18 perforations/inch (7.1 perforations/cm) were formed with a hole/land ratio of 1.0. These sheets had a high tear resistance.

The laser was adjusted to output 75 W at maximum current, 600 pulse per second pulse rate, and 3 msec pulse length. The press was adjusted to a speed of 85 ft/min (25.9 m/min). Sheets containing 8.5 perforations/inch (3.3 perforations/cm) were formed with a hole/land ratio of 3.0. These sheets had a slightly yellow appearance due to the condensation of the off gas. Addition of an air jet near the laser focus removed the vaporized material so that no yellowing of the paper occurred.

CFB and CF paper rolls were also laser perforated and sheeted. These papers were 8" wide (20.3 cm) blue/purple CFB carbonless paper roll and 8" wide (20.3 cm) CF paper, both manufactured by the Carbonless Products Department of 3M Company, St. Paul, Minn. The CF, CFB, and CF sheets all retained significant rigidity upon laser perforation, were not scored along the perforation line, and did not sag along the line of perforation. The CF and CFB sheets also did not form a blue/purple image along the line of perforation, thus indicating minimal microcapsule rupture in the perforation region.

The sheets of CB, CFB, and CF were printed upon using a Ryobi press. Press speed was 7500 sheets/hr. The sheets printed in a manner similar to unperforated paper, laid flat in the feed tray and receiving tray, and did not separate along the perforations upon feeding either when being gripped along the perforations or when being gripped across the perforations. Collating and padding with 3M Padding adhesive and fan-out gave 3-part form-sets. No blue/purple line was noted between the sheets along the line of perforation.

EXPERIMENT 3

Single, carbonless transfer sheets with a CFB coating were laser perforated with the laser of Experiment 2. The laser was adjusted to put out 75 W at maximum current, 600 pulse per second pulse rate, and 3 msec pulse length. The sheet contained 3.3 perforations/cm and had a hole/land ratio of about 3.0. The paper was a 16.5 pound canary paper.

Single, carbonless transfer sheets with a CB coating were mechanically perforated using a Rollem perforator available from Rollem Corporation. The sheet contained about 4.2 perforations/cm and had a hole/land ratio of about 3.0. The paper was a 20 pound white paper.

The experiment involved a flexing of the tab, along the perforation line. The sheet was flexed twice 180°, the first flex involved bending the tab until the tab contacted a front portion of the sheet, and a second bending in the opposite direction until the tab contacted a back portion of the sheet. This sheet was then subjected to the Pull Strength Test described above. A new sheet was then subjected to the flex cycle two times and was thereafter subjected to the Pull Strength Test. The experiment was repeated for 1–9 flex cycles. The experiment was performed for the laser and mechanically perforated papers. The following are the results:

| # Flex Cycles | Pull Strength (Newtons) Laser Perf. | Pull Strength (Newtons) Mech. Perf. |
| --- | --- | --- |
| 0 | 33.7 | 44.0 |
| 1 | 32.0 | 36.8 |
| 2 | 28.7 | 27.5 |
| 3 | 32.0 | 31.6 |
| 4 | 28.9 | 20.3 |
| 5 | 30.0 | 22.3 |
| 6 | 30.3 | 16.6 |
| 7 | 29.2 | 30.6 |
| 8 | 26.9 | 22.4 |
| 9 | 29.2 | 24.1 |

The above results are graphed in FIG. 1. The coordinates represented by circles correspond to the laser perforated samples, and the coordinates represented by squares correspond to mechanically perforated samples. Line 10 is plotted through the laser perforated coordinates and line 12 is plotted through the mechanically perforated coordinates. The two lines were plotted through the points using linear regression. The x-axis is scaled in Newtons and the y-axis is scaled in the number of complete flex cycles the paper was subjected to. It is apparent the mechanically perforated paper lost considerable strength as the number of flex cycles increased as compared to the laser perforated paper. Furthermore, it is to be noted the weight of the mechanically perforated paper was heavier, and thus should be stronger than the lighter paper used in the laser perforated samples. However, the laser perforated paper exceeded the mechanically perforated paper even though it was a lighter paper.

EXPERIMENT 4

Single carbonless transfer sheets with a CB coating were laser perforated with a laser of experiment 2. The sheet contained 4.7 perforations/cm, and had a hole/land ratio of about 2.5. The paper was a 16.5 pound white CB paper with an approximate caliper of 0.0032 inch.

Single, plain 20 pound bond paper without any coating had a mechanical perforation provided of 4.7 perforations/cm, and had a hole/land ratio of about 3.0. The paper was a computer 20 pound plain bond paper with an approximate caliper of 0.0039 inch.

The sheets were subjected to the Post-Flex Pull Test as described above, with the following results:

| # Flex Cycles | Pull Strength (Newtons) Laser Perf. | Pull Strength (Newtons) Mech. Perf. |
| --- | --- | --- |
| 0 | 19.8 | 29.2 |
| 1 | 18.4 | 19.4 |
| 2 | 17.5 | 17.0 |
| 3 | 16.3 | 15.0 |
| 6 | 14.3 | 12.6 |
| 9 | 15.1 | 16.3 |
| 12 | 14.3 | 14.7 |

From the above table, it is apparent that both papers decreased in strength as the flex cycles increased. After six cycles, the papers had about the same Post-Flex Pull Test, even though the mechanically perforated paper was initially much stronger, and the laser perforated paper was much lighter and had a smaller land/hole ratio.

As will be apparent to those skilled in the art, various other modifications can be carried out from the above without departing from the spirit and scope of the invention.

What is claimed is:

1. A form-set of carbonless papers comprising a plurality of perforated sheets, said form-set including at least a first sheet containing a first coating of an encapsulated colorformer and a second sheet containing a second coating of a developer, said first and second sheets being positioned such that said first and second coatings are juxtaposed, said form-set made by the process comprising the following steps, in order, of:

(a) providing perforated sheets of carbonless paper by a process including the steps of (i) providing a first carbonless paper having said first coating on at least one surface thereof and a second carbonless paper having said second coating on at least one surface thereof, and (ii) exposing each of said first carbonless paper and second carbonless paper to a laser beam to create a plurality of perforations in each of said first carbonless paper and second carbonless paper, said perforations defining a line between first and second portions of each of said first carbonless paper and second carbonless paper;

(b) processing said perforated sheets by sheet-fed equipment; and (c) securing said first sheet to said second sheet to form a form-set such that said first and second coatings are juxtaposed.

2. The form-set of claim 1 wherein the sheet-fed equipment is a photocopier.

3. The form-set of claim 1 wherein the sheet-fed equipment is a printing press.

4. The form-set of claim 1 wherein the sheet-fed equipment is a folding machine.

5. The form-set of claim 1 wherein the sheets are cut to size after creation of the line of perforation.

6. The form-set of claim 1 wherein said line of perforations has a hole/land ratio of about 1:1 to 6:1.

7. The form-set of claim 1 wherein said laser beam has a pulse rate of less than about 2000 pulses per second.

8. The form-set of claim 1 wherein said securing results from an adhesive.

9. The form-set of claim 1 wherein a Tear Strength force of at least 2.0 Newtons is required to separate one sheet from said form-set.

10. The form-set of claim 1 wherein there is minimal microcapsule rupture in the sheet areas adjoining the perforations.

11. The form-set of claim 1 wherein the first coating covers one entire face of the first sheet and the second coating covers one entire face of the second sheet.

12. A form-set of carbonless papers comprising a plurality of perforated sheets, said form-set including at least a first sheet containing a first coating of an encapsulated color-former, a second sheet containing a first coating of an encapsulated color-former on one side of said sheet and a second coating of a developer on the other side of said sheet, and a third sheet containing a second coating of a developer; said first, second and third sheets being positioned such that said first and second coatings are juxtaposed, said form-set made by the process comprising the following steps, in order, of:

(a) providing perforated sheets of carbonless paper by a process including the steps of (i) providing a first carbonless paper having said first coating on at least one surface thereof, a second carbonless paper having said first coating on one side of said second carbonless paper and a second coating on the other side of said second carbonless paper, and a third carbonless paper having said second coating on at least one surface thereof, and (ii) exposing each of said first carbonless paper, second carbonless paper and third carbonless paper to a laser beam to create a plurality of perforations in each of said first carbonless paper, second carbonless paper and third carbonless paper, said perforations defining a line between first and second potions of each of said first carbonless paper, second carbonless paper and third carbonless paper;

(b) processing said perforated sheets by sheet-fed equipment; and (c) securing said first, second and third sheets together to form a form-set such that said first and second coatings are juxtaposed.

13. The form-set of claim 12 wherein the sheet-fed equipment is a photocopier.

14. The form-set of claim 12 wherein the sheet-fed equipment is a printing press.

15. The form-set of claim 12 wherein the sheet-fed equipment is a folding machine.

16. The form-set of claim 12 wherein the sheets are cut to size after creation of the line of perforation.

17. A form-set of carbonless papers comprising a plurality of perforated sheets, said form-set including at least a first sheet and a second sheet wherein at least one of said first and second sheets is a self-contained carbonless paper, said form-set made by the process comprising the following steps, in order, of:

(a) providing perforated sheets of paper by a process including the steps of (i) providing a first paper and a second self-contained carbonless paper, and (ii) exposing each of said first paper and second self-contained carbonless paper to a laser beam to create a plurality of perforations in each of said first paper and said second self-contained carbonless paper, said perforations defining a line between first and second portions of each of said first paper and said second self-contained carbonless paper;

(b) processing said perforated sheets by sheet-fed equipment; and (c) securing said first sheet to said second sheet to form a form-set.

18. A form-set of carbonless papers comprising a plurality of perforated sheets, said form-set including at least a first sheet, a second sheet, and a third sheet, wherein the second and third sheets are self-contained carbonless paper, said form-set made by the process comprising the following steps, in order, of:

(a) providing perforated sheets of paper by a process including the steps of (i) providing a first paper and a second and a third self-contained carbonless paper and (ii) exposing each of said first paper, second carbonless paper and third carbonless paper to a laser beam to create a plurality of perforations in each of said first paper, second carbonless paper and third carbonless paper, said perforations defining a line between first and second portions of each of said first paper, second carbonless paper and third carbonless paper;

(b) processing said perforated sheets by sheet-fed equipment; and (c) securing said first, second and third sheets together to form a form-set.

19. The formset of claim 17 wherein the sheets are cut to size after creation of the line of perforation.

20. The formset of claim 18 wherein the sheets are cut to size after creation of the line of perforation.

* * * * *

UNITED STATES PATENT AND TRADEMARK OFFICE
CERTIFICATE OF CORRECTION

PATENT NO.: 5,556,826

DATED: September 17, 1996

INVENTOR(S): Perrington et al.

It is certified that error appears in the above-identified patent and that said Letters Patent is hereby corrected as shown below:

Col. 6, line 62, "i e.," should be --i.e.,--

Col. 8, line 18, "CO2" should be --$CO_2$--.

Col. 11, line 35, "from" should be --form--.

Col. 12, line 5, "potions" should be --portions--.

Signed and Sealed this

Ninth Day of September, 1997

BRUCE LEHMAN

Attest:

Attesting Officer

Commissioner of Patents and Trademarks